(12) United States Patent
Saito et al.

(10) Patent No.: US 7,347,627 B2
(45) Date of Patent: Mar. 25, 2008

(54) OPTICAL CONNECTOR

(75) Inventors: Daigo Saito, Sakura (JP); Kazuhiro Takizawa, Sakura (JP); Hiroshi Furukawa, Yotsukaido (JP); Terutake Kobayashi, Sakura (JP); Hiroshi Aoyama, Tsukuba (JP); Yasuhiko Hoshino, Tsukuba (JP); Yasou Oda, Tsukuba (JP)

(73) Assignees: Fujikura Ltd., Tokyo (JP); Nippon Telegraph & Telephone Corp., Tokyo (JP)

( * ) Notice: Subject to any disclaimer, the term of this patent is extended or adjusted under 35 U.S.C. 154(b) by 0 days.

(21) Appl. No.: 11/683,175

(22) Filed: Mar. 7, 2007

(65) Prior Publication Data
US 2007/0211997 A1    Sep. 13, 2007

(30) Foreign Application Priority Data
Mar. 8, 2006  (JP) .............................. 2006-062813

(51) Int. Cl.
*G02B 6/36* (2006.01)
(52) U.S. Cl. .......................................... 385/60; 385/78
(58) Field of Classification Search ................ 385/60, 385/78
See application file for complete search history.

(56) References Cited

U.S. PATENT DOCUMENTS

| 5,687,268 | A | * | 11/1997 | Stephenson et al. | ........... 385/73 |
| 5,909,526 | A | * | 6/1999 | Roth et al. | ..................... 385/78 |
| 6,789,958 | B2 | * | 9/2004 | Ahrens et al. | ................. 385/92 |
| 6,851,867 | B2 | * | 2/2005 | Pang et al. | .................... 385/88 |

FOREIGN PATENT DOCUMENTS

| JP | 2002-023006 A | 1/2002 |
| JP | 2002-055259 A | 2/2002 |
| JP | 2005-099706 A | 4/2005 |

* cited by examiner

*Primary Examiner*—Quyen P Leung
(74) *Attorney, Agent, or Firm*—Sughrue Mion, PLLC

(57) ABSTRACT

An optical connector includes a connector body that has a first optical fiber housed in advance in a ferrule so as to project from a back end of the ferrule opposite to the connecting end surface and an anchoring fixture that anchors a second optical fiber that is to be optically connected to the first optical fiber, and by pressing the anchoring fixture into the connector body while the second optical fiber is anchored in this anchoring fixture, the anchoring fixture and the connector body are connected to optically connect the first optical fiber and the second optical fiber, and the connecting portion that connects the anchoring fixture and the connector body form a movable connecting portion that is adapted to vary the direction of the anchoring fixture with respect to the connector body.

6 Claims, 14 Drawing Sheets

OPTICAL CONNECTOR

BACKGROUND OF THE INVENTION

1. Field of the Invention

The present invention relates to an optical connector used in the connection of optical fibers.

Priority is claimed on Japanese Patent Application No. 2006-62913, filed Mar. 8, 2006, the content of which is incorporated herein by reference.

2. Description of Related Art

In recent years, an optical connector has been propose, of which assembling operation can be carried out at a connection site other than a factory. For such an optical connector, an optical connector including a ferrule that houses and fastens an optical fiber in advance after the distal end surface thereof has been polished and a clamping portion disposed on the back portion (the position on the side opposite to the distal end surface) of this ferrule has been proposed. In this optical connector, in the clamping portion the optical fiber (below, the inner optical fiber) on the ferrule side and another connection optical fiber (below, the iron optical fiber) that abuts this optical fiber are maintained in an abutted and connected state by being clamped in split elements of the clamping portion. Here, because the size of the clamping portion is small, a dedicated tool that carried out the opening and closing operation of the elements (optical fiber tool) has been proposed (for example, refer to Japanese Unexamined Patent Application, First Publication No. 2002-23006, Japanese Unexamined Patent Application, First Publication No. 2002-55259, and Japanese Unexamined Patent Application, First Publication No. 2005-99706).

At the same time, during the assembly of this type of optical connector, it is very important that the back end of the inner optical fiber housed in advance and the distal end of the insertion optical fiber to be inserted are reliably abutted. Thus, conventionally, the reliable abutment of the distal end of the insertion optical fiber with the back end of the inner optical fiber has been confirmed visually. Concretely, by visually confirming the bending of the insertion optical fiber that occurs when the distal end of the insertion optical fiber is abutted against the inner optical fiber, it is confirmed that the optical fibers are correctly abutting each other.

However, when the insertion optical fiber is attached to the optical fiber after bending in the manner described above, the following inconveniences occur. Specifically, because a portion of the insertion optical fiber bends, a misalignment occurs between the optical axis of the insertion optical fiber and the optical axis of the inner optical fiber. In addition, when the optical fiber is bent, at the bending location, loss may occur in the propagated light. In addition, when the ached optical connector (the male optical connector) is fitted into the other adaptor (the female optical connector), the insertion optical fiber described above is generally retracted. Thereby, the bending of the optical fiber (coated optical fiber) is further increased, and the inconveniences described above become severe.

SUMMARY OF THE INVENTION

In consideration of the problems described above, an object of the present invention is to provide an optical connector that is structured such that the bending of the bent insertion optical fiber is decreased due to reliably abutting the back end of the inner optical fiber and the distal end of the optical fiber, and wherein the inconvenience of loss occurring in the propagated light is eliminated, and light is advantageously propagated.

In order to solve the problems described above, an optical connector having the devices described below is provided.

Specifically, a first aspect of the present invention is an optical connector that includes a connector body and an anchoring member. In the connector body, an inner optical fiber is built in that is housed and fastened by the ferrule whose connecting end surface is disposed in the distal end side and a portion of which projects from the back end side of this ferrule. The anchoring member holds the insertion optical fiber whose distal end is abutted and optically connected to the back end of the inner optical fiber, and the distal end of the insertion optical fiber can abut against the back end of the inner optical fiber when brought into contact with the connector body. A cover body is provided on the connector body. The cover body is pivotable between a stand-by position and a holding position. In the stand-by position, an axis of the cover body is out of alignment with an axis of insertion direction of the insertion optical fiber and the anchoring member is approachable to the connector body. In the holding position, the axis of the cover body is aligned with the axis of insertion direction of the insertion optical fiber and the anchoring member is covered and held by the cover body. An abutting convexity that abuts a distal end side wall surface of the anchoring member is provided so as to project on the inside surface of the outer cover opposite to the outer surface of the anchoring member side. When the cover body is rotated from the stand-by position to the holding position, the abutment convexity abuts the distal end side wall surface of the anchoring member such that the anchoring member moves while being pushed towards the retaining direction.

A second aspect of the present invention is characterized in that, in the optical connector of the sixteenth aspect, the abutting surface of the abutment convexity that abuts the distal end side wall surface of the anchoring member is formed to incline in the insertion direction of the insertion optical fiber from the center portion towards the distal end portion.

A third aspect of the present invention is characterized in that, in the optical connector of the sixteenth aspect, a retraction restricting convexity, which restricts the movement of the anchoring member in the retraction direction by abutting the back end side wall space of the anchoring member when the cover body is positioned at the holding position, is provided so as to project on the back end portion of the cover body.

A fourth aspect of the present invention is characterized in that, in the optical connector of the sixteenth aspect, a projecting portion that projects in the transverse direction is provided on the anchoring member. An engaging window portion passes through the cover body in the transverse direction. When the cover body is positioned in the holding position, the projecting portion of the anchoring member allows play, and can thereby engage the engaging window portion.

A fifth aspect of the present invention is characterized in that, in the optical connector of the sixteenth aspect, a latch portion that projects towards the distal end side is provided on the connector body.

A sixth aspect of the present invention is characterized in that, in the optical connector of the sixteenth aspect, a clamping portion that accommodates clamped half split elements is built into the connector body, and at the same time, insertion members that are wedged into the split of these clamped elements are provided.

According to the optical connector of the present invention, the bending of the insertion optical fiber that is bent because of the reliable abutment between the back end of the inner optical fiber and the distal end of the insertion optical fiber is decreased, and the inconvenience in which loss occurs in the propagated light is eliminated. Thereby, in the optical connector, the inner optical fiber and the insertion optical fiber are properly connected, and light is advantageously propagated.

DETAILED DESCRIPTION OF THE INVENTION

Figure 1:
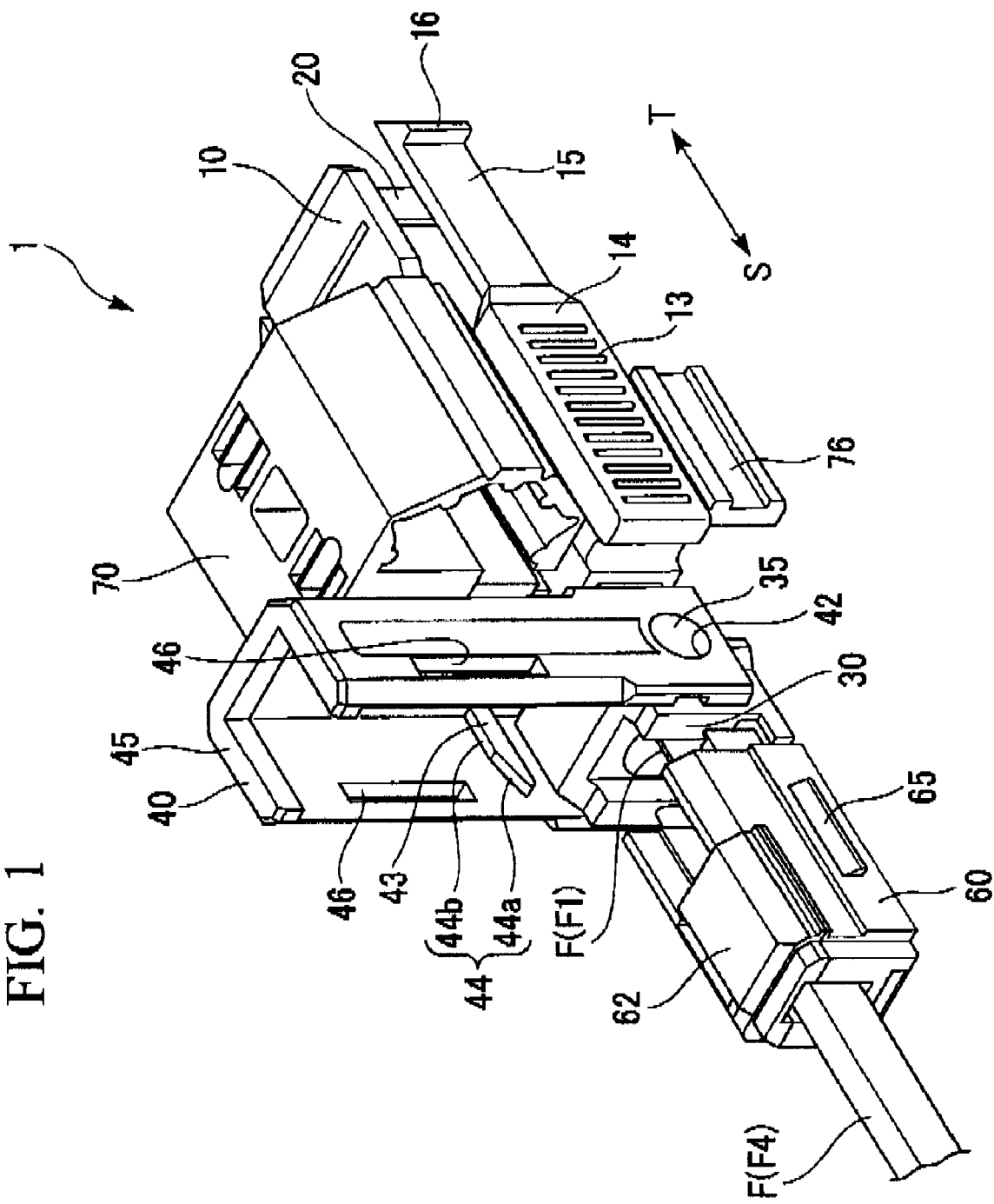
FIG. 1 is a perspective view (cover body in the stand-by position) of the entire optical connector in an embodiment of the present invention.
Figure 2:
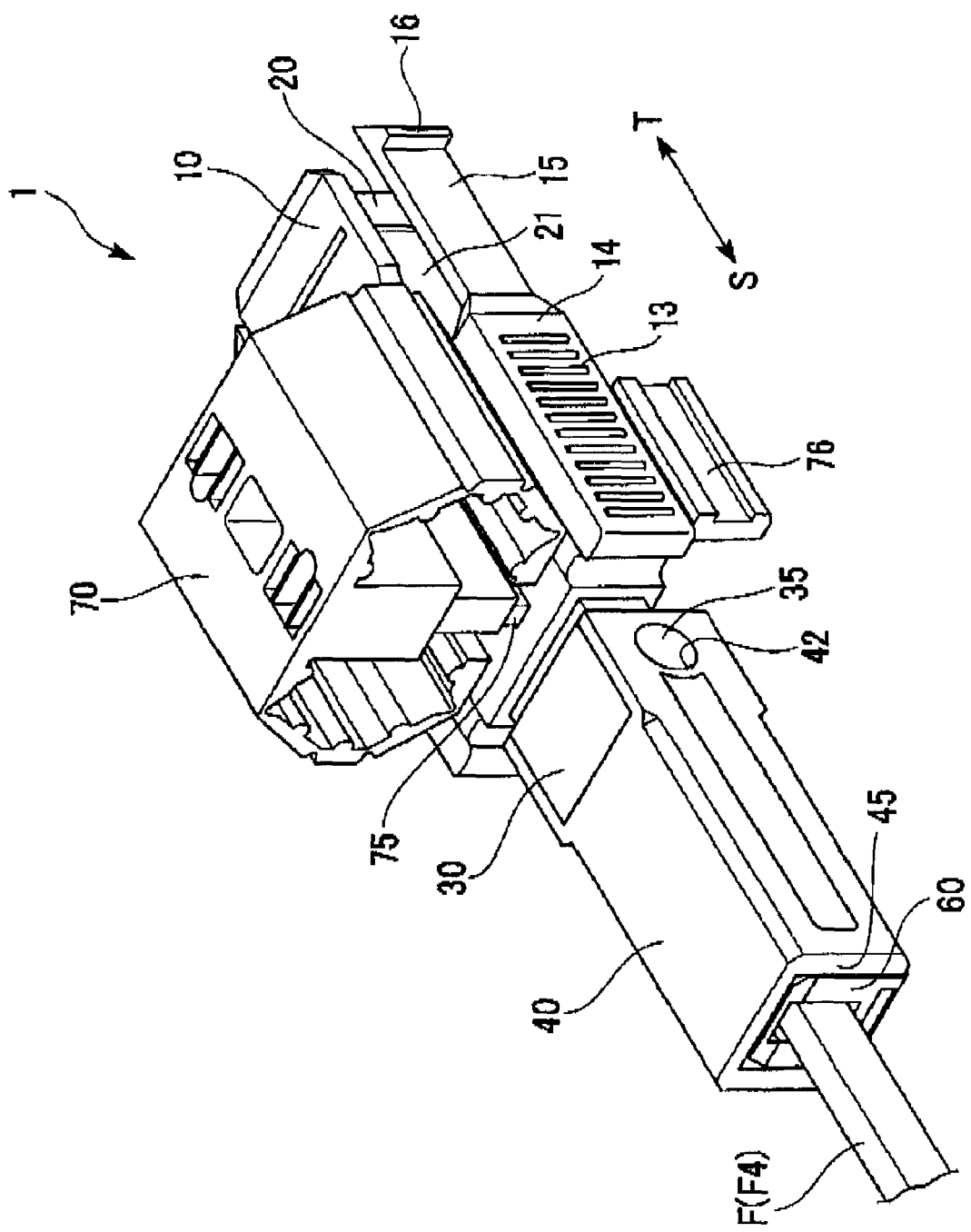
FIG. 2 is a perspective view (cover body in the holding position) of the entire optical connector in the embodiment of the present invention.
Figure 3:
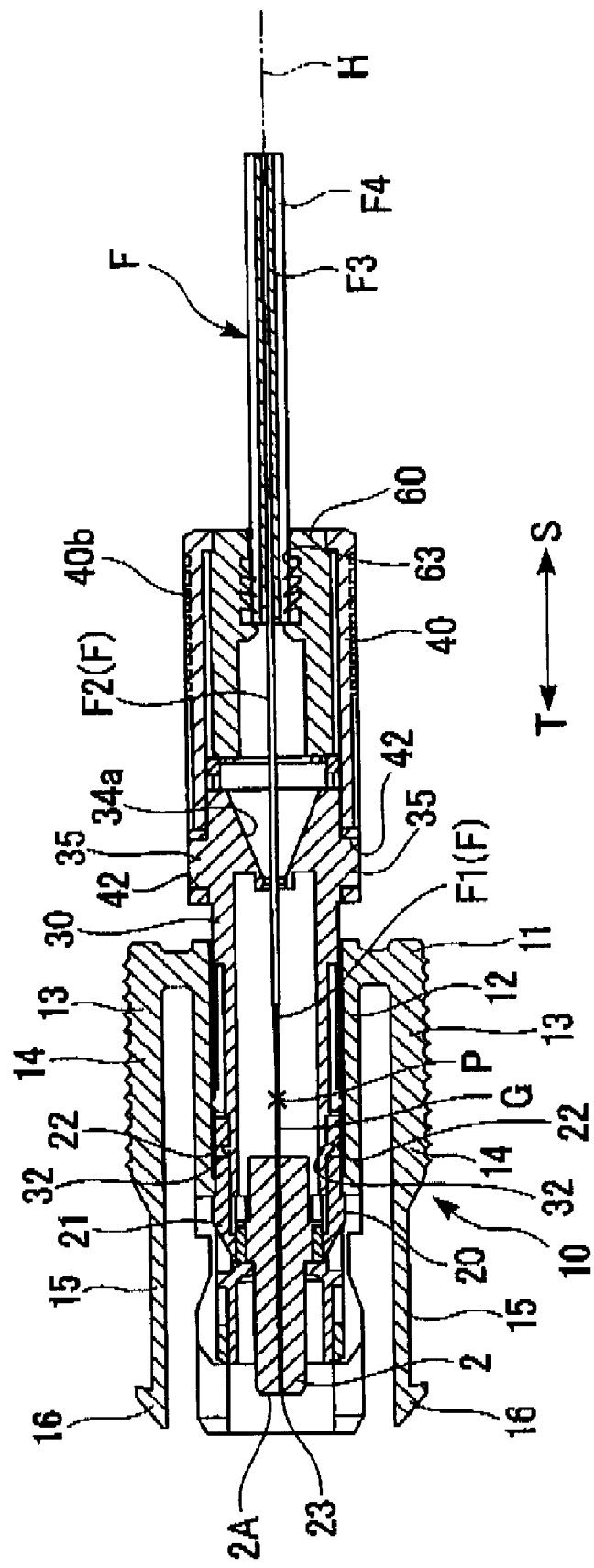
FIG. 3 is a horizontal cross-sectional drawing of the optical connector in FIG. 29.
Figure 4:
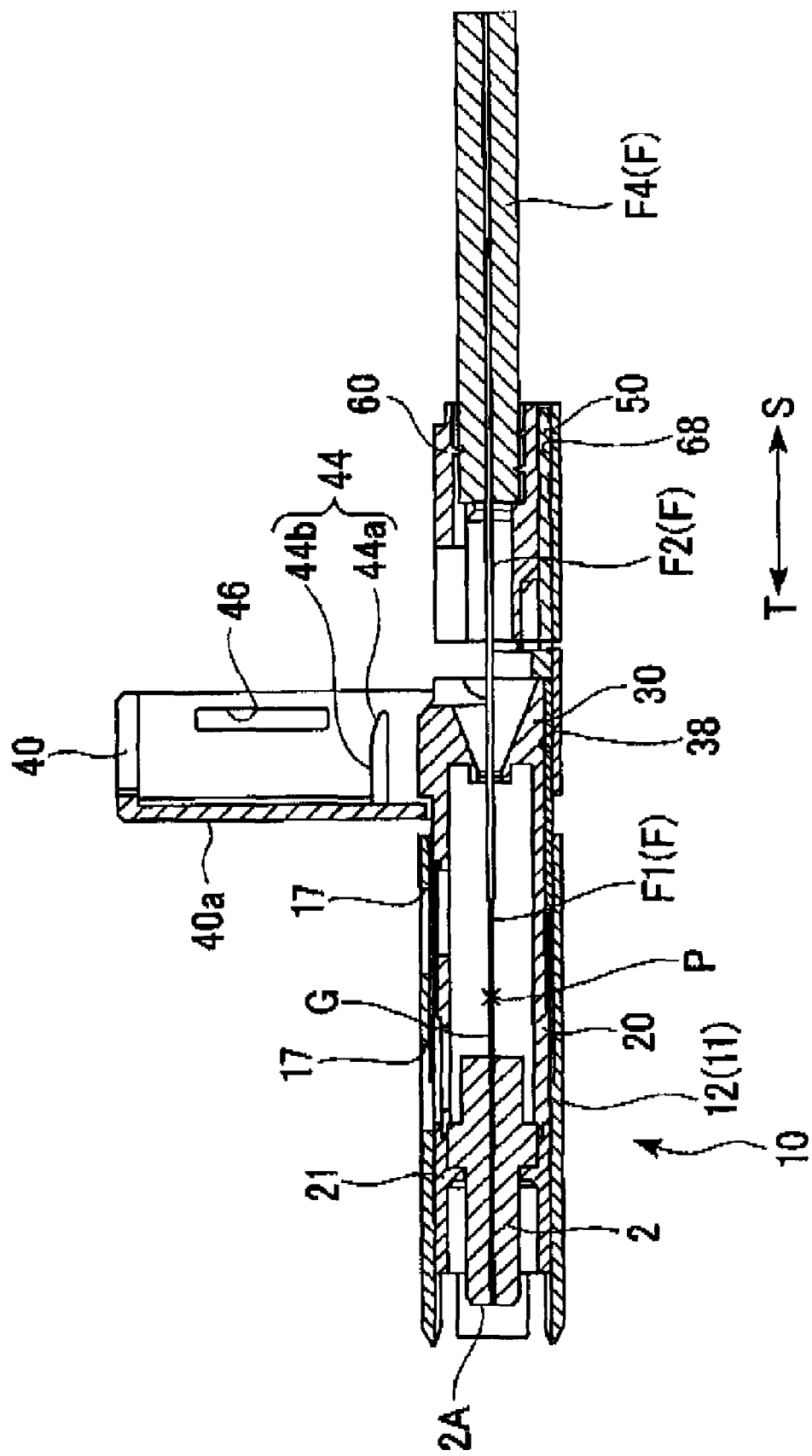
FIG. 4 is a vertical cross-sectional drawing (cover body in the stand-by position) of the optical connector in FIG. 1.
Figure 5:
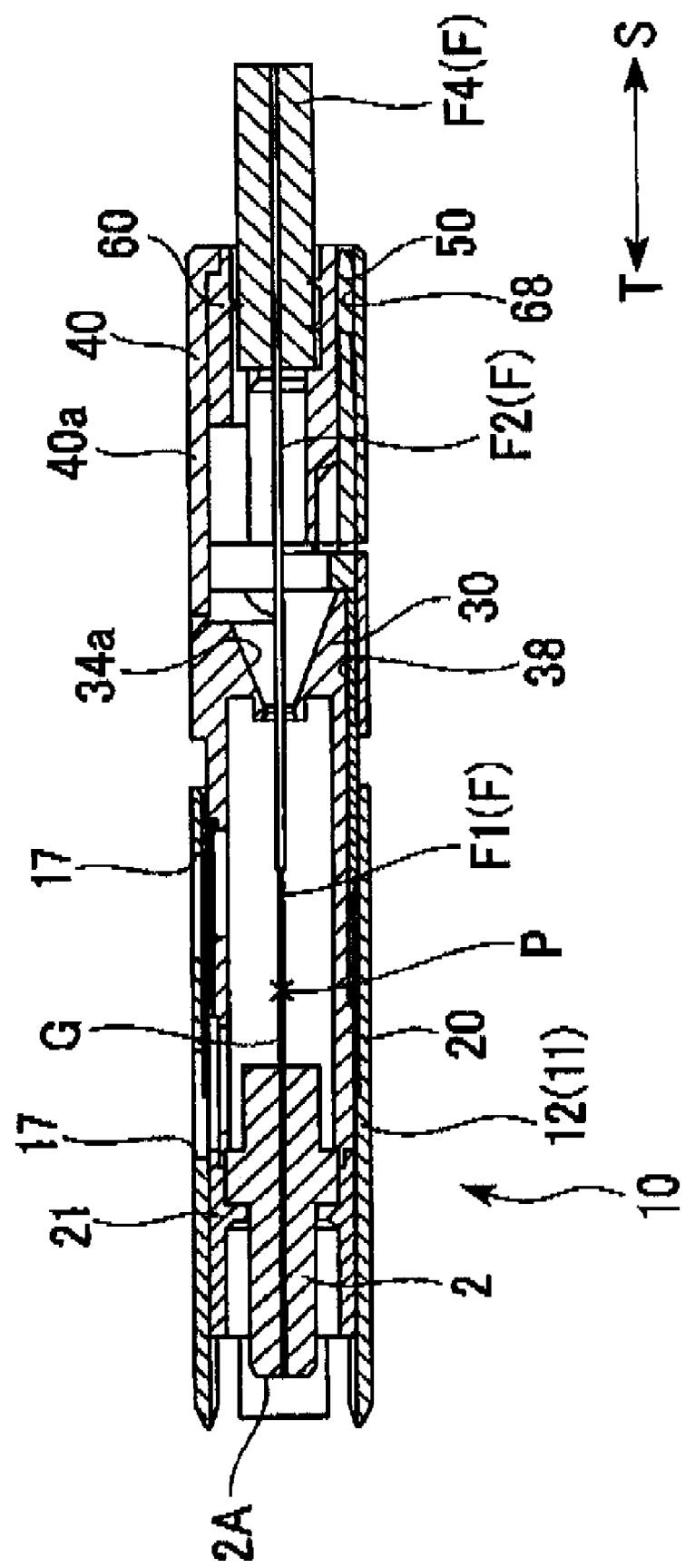
FIG. 5 is a vertical cross-sectional drawing (cover body in the holding position) of the optical connector in FIG. 1.
Figure 6A:
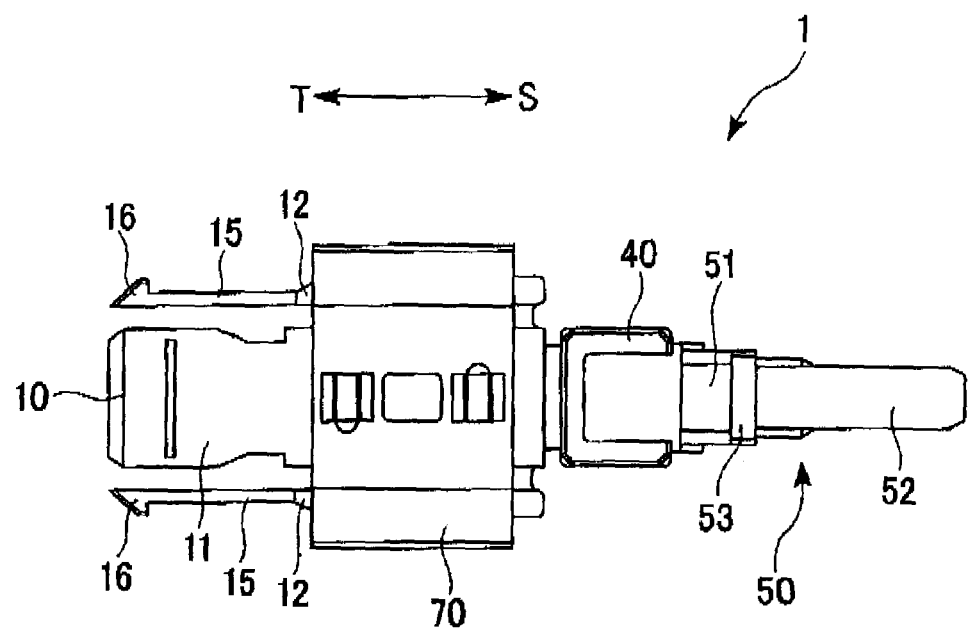
FIG. 6A is an upper view of the connector body.
Figure 6B:
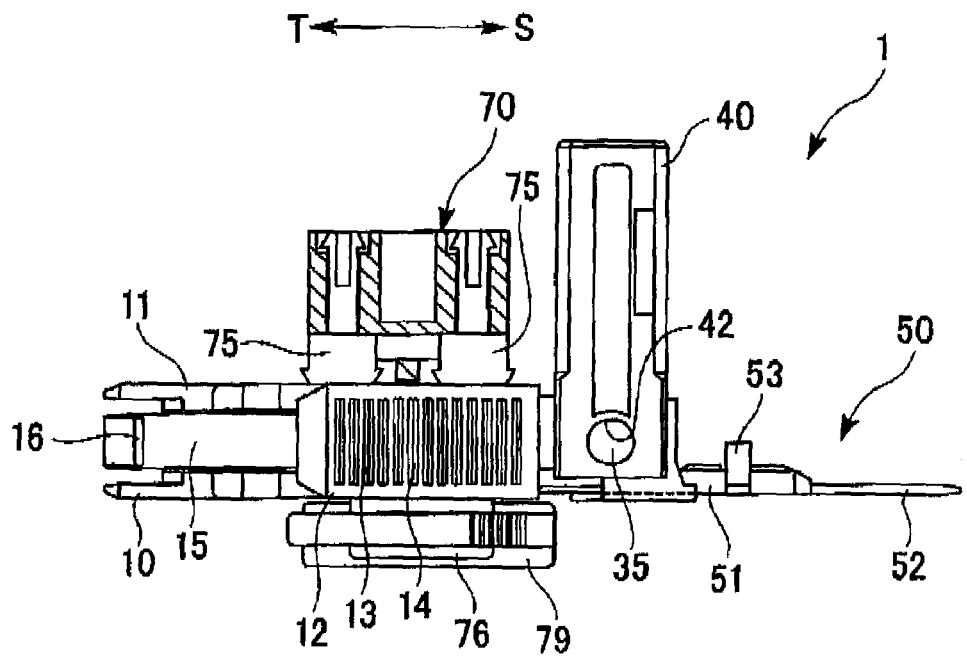
FIG. 6B is a side view of the connector body.
Figure 7:
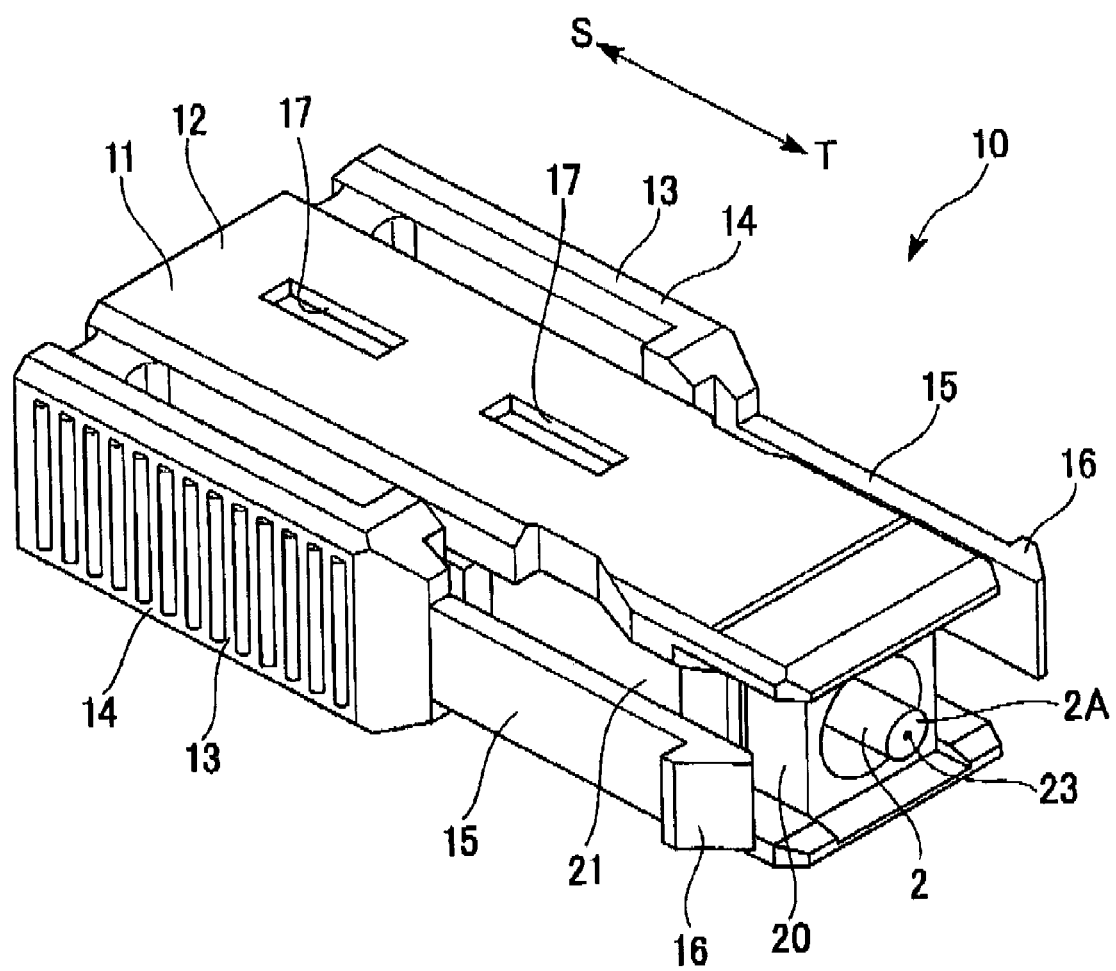
FIG. 7 is a perspective view of the connector body.
Figure 8A:
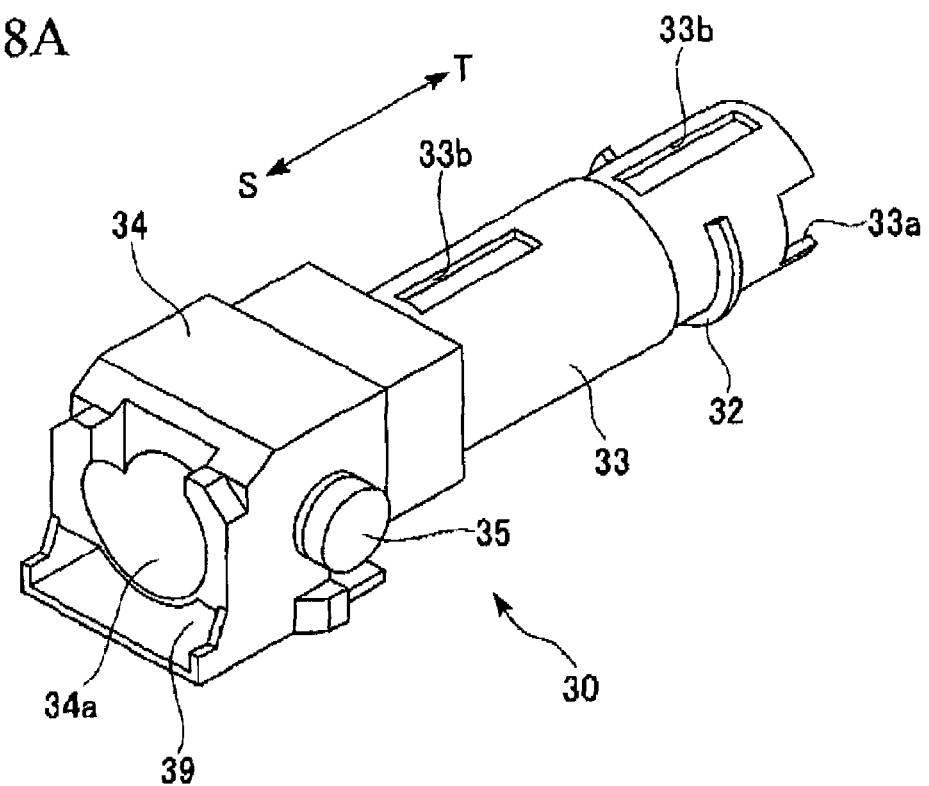
FIGS. 8A and 8B are perspective views of the clamping member.
Figure 8B:
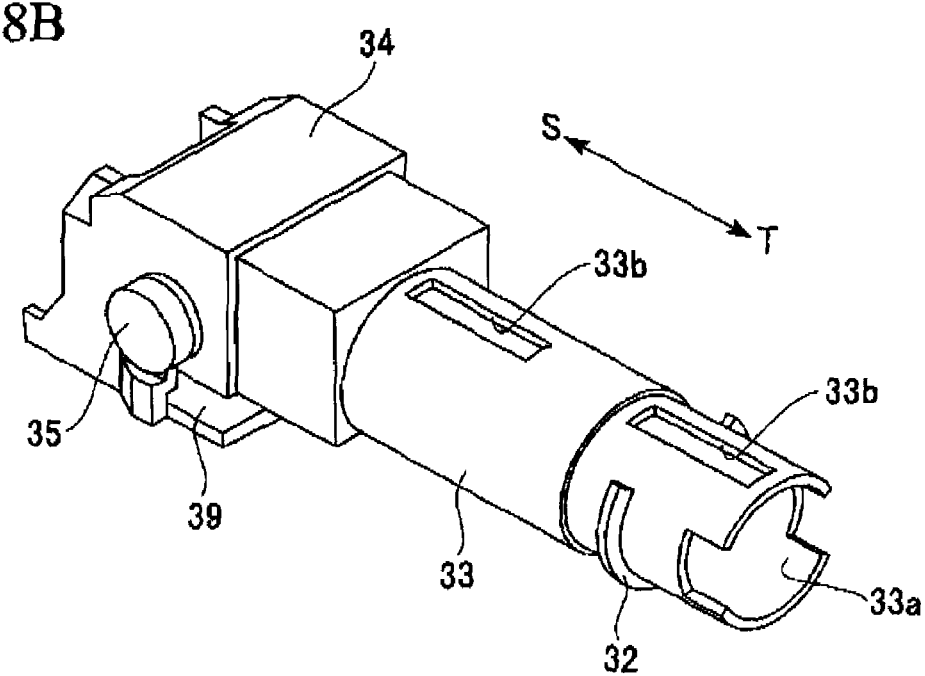
Figure 9A:
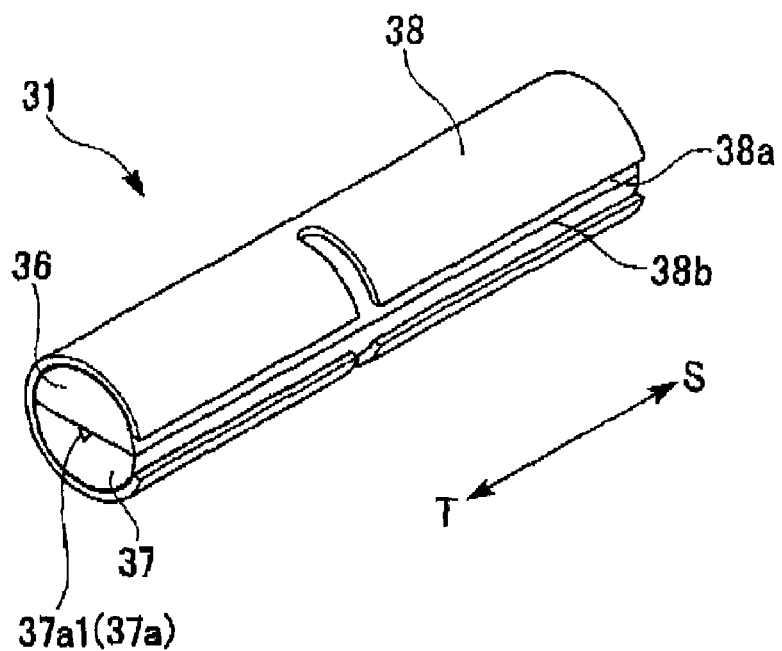
FIG. 9A is a perspective view of the clamping portion accommodated in the clamping member in FIGS. 8A and 8B.
Figure 9B:
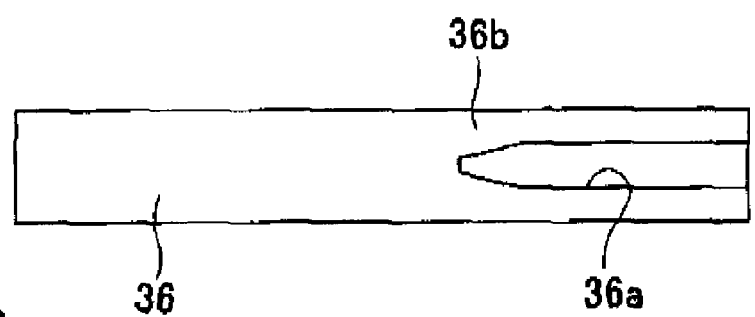
FIG. 9B is a cut-away side view thereof.
Figure 9B:
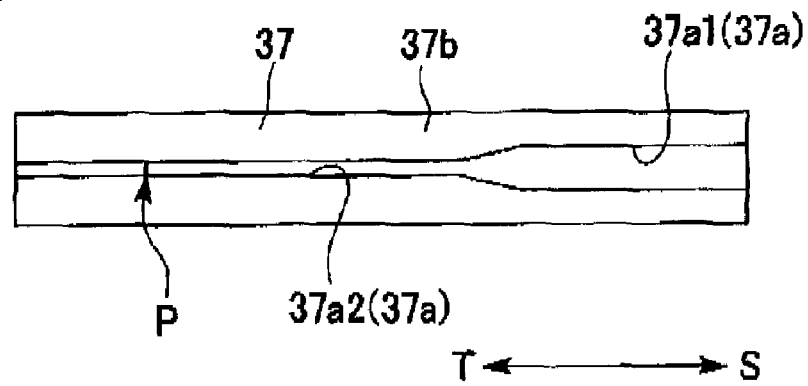
Figure 10:
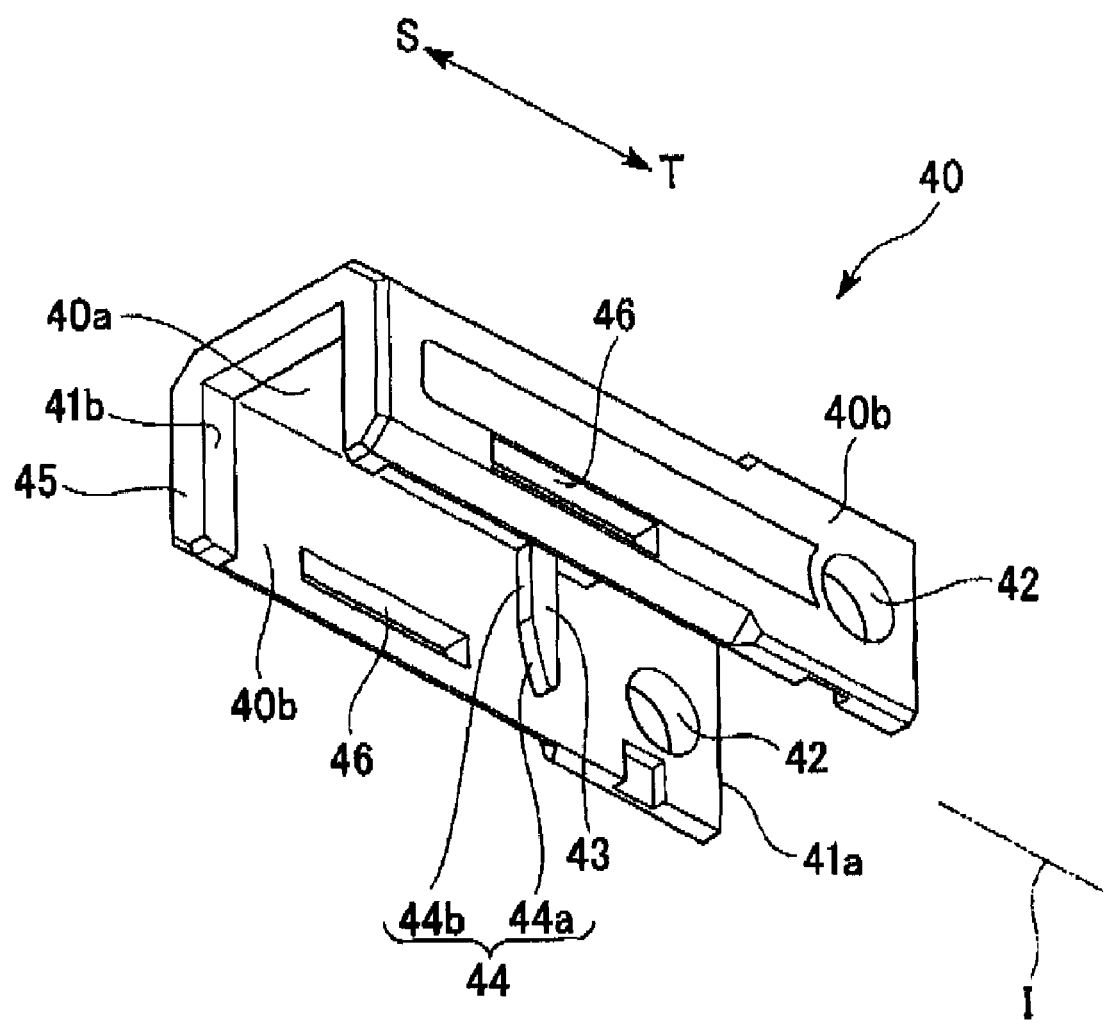
FIG. 10 is a perspective view of the cover body.
Figure 11A:
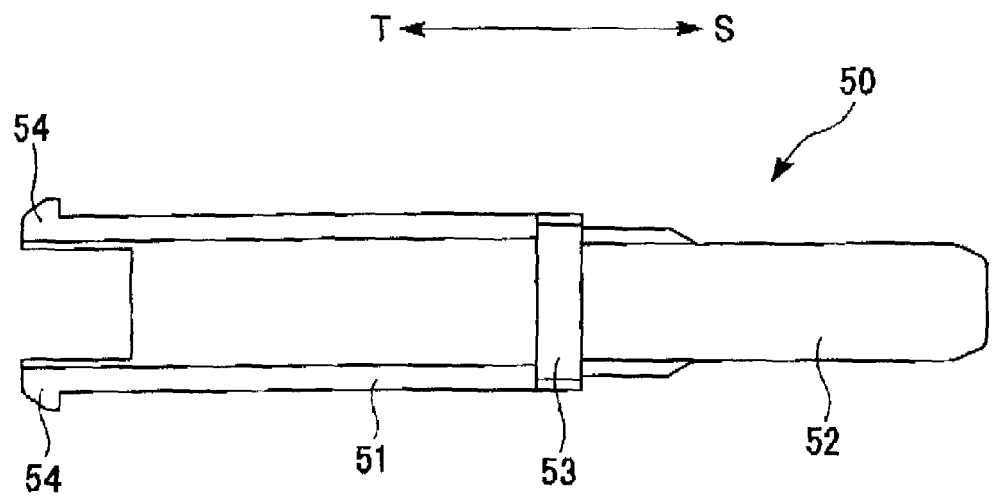
FIG. 11A is a plan view of the guiding plate.
Figure 11B:
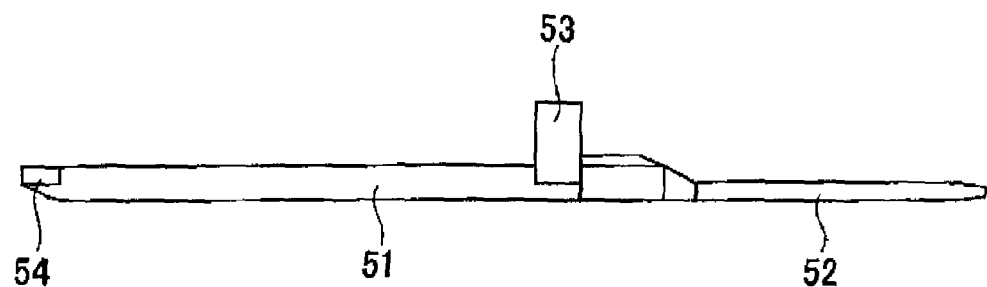
FIG. 11B is a side view of the guiding plate.
Figure 11C:
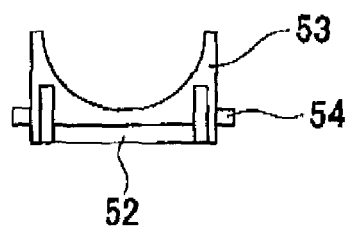
FIG. 11C is a front view of the guiding plate.
Figure 12A:
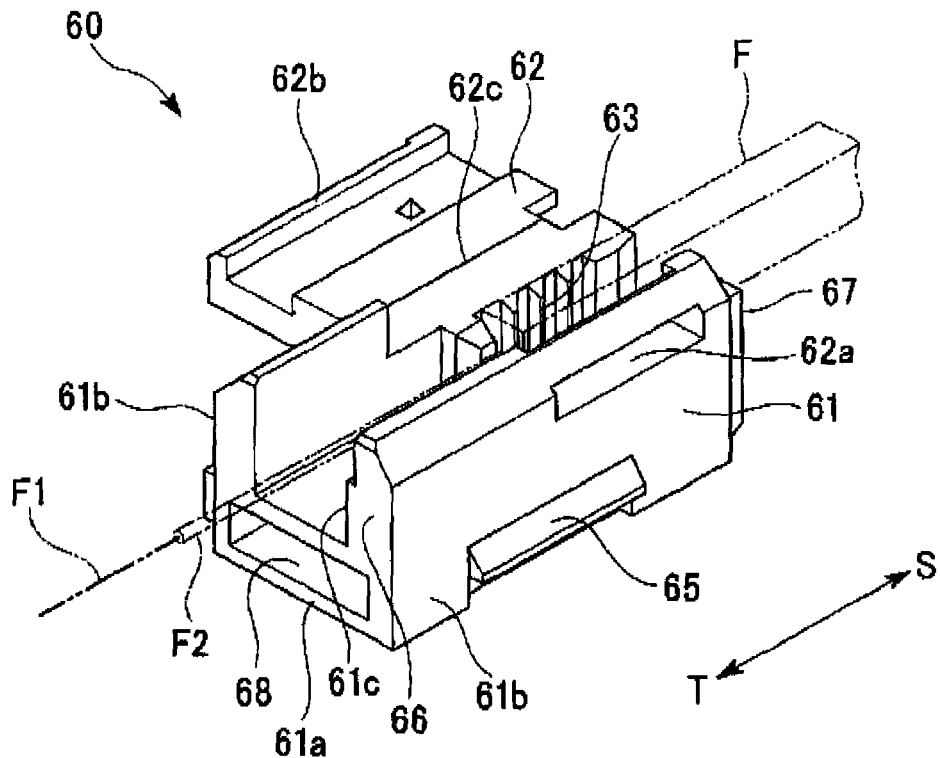
FIG. 12A is a perspective view of the anchoring member.
Figure 12B:
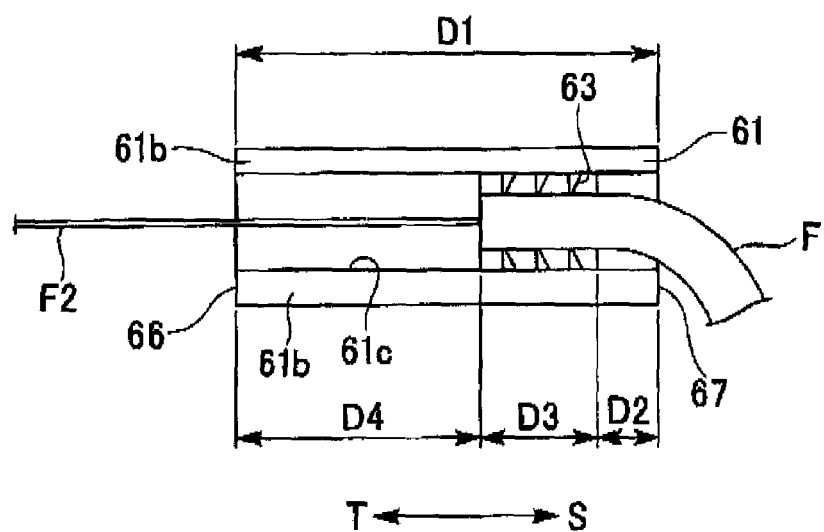
FIG. 12B is a schematic plan view of the anchoring member.
Figure 13A:
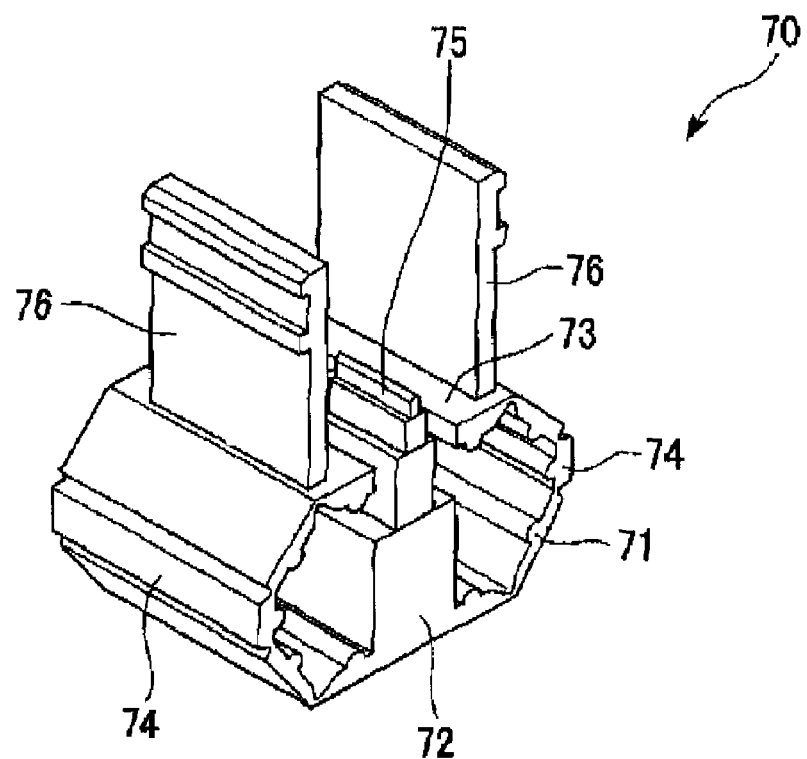
FIG. 13A is a perspective view of the insertion unit.
Figure 13B:
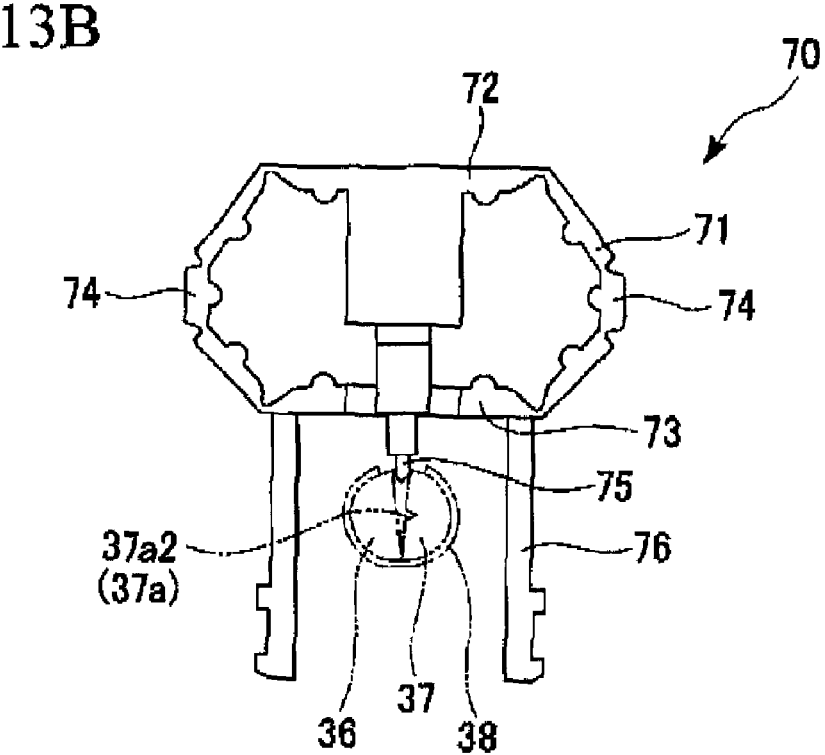
FIG. 13B is a front view of the insertion unit.

Hereafter, an embodiment of the present invention will be explained with reference to the drawings. FIG. 1 is a perspective view of the entire optical connector (where the cover body is in the stand-by position) according to the present invention. FIG. 2 is a perspective view of the entire optical connector (where the cover body is in the holding position) according to the present invention FIG. 3 is a horizontal cross-sectional drawing of the optical connector in FIG. 1. FIG. 4 is a vertical cross-sectional drawing (where the outer cover is in the stand-by position) of the optical connector in FIG. 1. FIG. 5 is a vertical cross-sectional drawing (where the outer cover is in the holding position) of the optical connector of FIG. 1. FIG. 6A is a plan view of the connector, and FIG. 6B is a side view of the connector. FIG. 7 is a perspective view of the connector body. FIG. 8A and FIG. 8B are perspective views of the clamping member. FIG. 9A is a perspective view and a cut-away view of the clamping portion accommodated in the clamping member shown in FIGS. 8A and 8B, and FIG. 9B is a cut-away side drawing of the same. FIG. 10 is a perspective view of the cover body. FIG. 11A is a plan view of the guiding plate, FIG. 11B is a side view of the same, and FIG. 11C is a front view of the same. FIG. 12A is a perspective view of the anchoring member, and FIG. 12B is a schematic plan view of the same. FIG. 13A is a perspective view of the insertion unit, and FIG. 13B is a front view of the same. FIGS. 14A, 14B, 14C, 14D, and 14E are drawings showing the attachment of the optical connector.

Reference numeral 1 in FIG. 1 and FIG. 2 denotes the optical connector according to the present invention. This optical connector 1 is an optical connector that is generally assembled at a connection site. Note that the only difference between the optical connectors 1 disclosed in FIG. 1 and FIG. 2 is that the positions of the cover body 40 are different. As shown in the cross-sectional drawing in FIG. 3, this optical connector 1 connects the optical fibers G and F together by abutting the distal end of an insertion optical fiber F (a separate optical fiber from the inner optical fiber G) against the back end of the inner optical fiber G, which is housed and fastened by the ferrule 3. Note that in each of the cross-sectional drawings of FIG. 3 to FIG. 5, the illustration of the clamping portion 31 has been omitted so that the inner optical fiber G and the insertion optical fiber F are easy to see. In addition, the abutment point where the distal end of the insertion optical fiber F abuts the back end of the inner optical fiber G is denoted by the reference numeral P.

Although not specially illustrated, the optical connector 1 is a male optical connector that forms an optical connection by being inserted into another optical connector (the female optical connector). Note that when this optical connector 1 is inserted into another optical connector, the connecting end surface 2A of the ferrule 2 disposed at the distal end side of this optical connector 1 is abutted together with the connection end surface of the ferrule provided on the other optical connector, and thereby an optical connection is established.

In this optical connector 1, the distal end side at which the connecting end surface 2A of the built-in ferrule 2 is disposed is denoted by reference letter T, and the back end side opposite to the side at which this ferrule 2 is disposed is denoted by reference letter S. In addition, in the explanation of each of the parts below, although no reference numeral is attached, in the optical connector 1, the term "distal (end side)" is the direction towards the reference letter T, which is the direction towards the connecting end side of the ferrule, and in the optical connector 1, the term "back (end side)" is the direction towards the reference letter S, which is the direction opposite to the distal end side. These terms are used uniformly in this manner. Furthermore, the insertion direction of the insertion optical fiber F that is inserted into the optical connector 1 is the direction denoted by the reference letter T, and the axis thereof is denoted by the reference letter H.

The insertion optical fiber F that is inserted into this optical connector 1 is formed by the coated optical fiber F2, which is a resin cover provided on the outer periphery of the bare optical fiber F1 and an optical fiber cable F4 (indoor cable, drop cable, or the like), which is an outer cover provided, on the outer periphery of the optical fiber cable F2. However, the definition of the term "insertion optical fiber cable F" as used below includes all the bare optical fiber F1, the coated optical fiber F2, an optical fiber element F5, and the optical fiber cable F4.

As shown in FIG. 1 and FIG. 2, this optical connector 1 provides mainly a connector body 10 (refer, for example, to FIG. 3) having a ferrule 2 built in, and an anchoring member 60 (refer, for example, to FIGS. 12A and 12B) that is formed so as to be able to approach the connector body 10, and holds the insertion optical fiber F. First, the connector body 10 will be explained. As shown in the perspective view of FIG. 7, the connector body 10 includes mainly an outer housing 11, and an inner housing 20 built inside this outer housing 11 so as to be able to move slightly in a the insertion direction (the direction of the distal end side T) of the insertion optical fiber F.

As shown in each of the cross-sectional drawings in FIG. 3 to FIG. 5, in the plan view of FIG. 6A, and in the side view of FIG. 6B, this outer housing 11 is formed by the housing body 12 and an operating portion 13 provided integrally on the housing body 12 from the back end side of this housing body 12 in the transverse direction. This connector body 12 has a substantially tubular form that can be built into the inner housing 20. The operating portion 13 is formed from a handle portion 14 that is connected to the housing body 12 on the back end side S and a latch portion 15 that is provided so as to extend from this handle portion 14 towards the distal end side T. Lateral grooves are cut into the outer surface of the handle portion 14 so as to allow easy grasping by a hand. The latch portion 15 is a part that is fit into a recess provided in the other optical connector (the female optical connector) that is not illustrated, and like a typical latch, catches 16 that elastically deform inward are provided. In addition, on the upper surface of the housing body 12, through holes 17 are provided at two locations positioned extending on the axis of the insertion direction of the insertion optical fiber F. The through holes 17 allow the insertion members 75 provided in the insertion unit 70 to penetrate.

As shown in each of the cross-sectional drawings in FIG. 3 to FIG. 5, the inner housing 20 built into the outer housing 11 formed in this manner is formed by the clamping frame 21 and the clamping member 30 becoming integrated. As shown in the figures, the clamping frame 21 is structured similarly to a plug frame generally used, and is formed such that the distal end side and the back end side communicate. A ferrule 2 is provided that is fastened inside. In addition, a plug frame side engaging recess 22 is provided on the back end side of the plug frame 21. The plug frame 21 and the clamping member 30 are integrally formed by the plug member side engaging projection 32 provided on the distal end side of the plug member 30 (more specifically, the distal end side of the plug portion 31) being engaged in this plug frame side engaging recess 22. Specifically, they form the inner housing 20. Note that, as described below, because the clamping portion 31 that is built into the clamping member 30 is supported elastically this plug frame 21 can deforms flexibly towards the distal end side and the back end side.

The ferrule 2 that is fastened and built into this plug frame 21 provides thereon a small hole 23 that communicates with the distal end side and the back end side. This small hole 23 is formed so as to be disposed on the same axis as the axis H of the insertion optical fiber F described above. In addition, the distal end surface of the ferrule 2 is formed as a connecting end surface 2A that connects with the ferrule in the other optical connector, and is exposed at the distal end side of the optical connector 10. In addition, the back end portion of the ferrule 2 is fit into the tube portion 33 of this clamping member 30 so as to be insured from the opening portion 33a of the tube portion 33 of the clamping member 30. In addition, the back end surface of the ferrule 2 abuts the distal end surface of the clamping portion 31 that is flexibly supported in this tube portion 33. This ferrule 2 is formed by a ceramic such as zirconium or a rigid material such as a glass. In addition, the center portion of the outer periphery of the ferrule 2 and the inner part of the plug frame 21 described above contact so as to press on each other, and thereby, the ferrule 2 is built-in to the plug frame 21 in a fastened state.

Net the clamping member 30, which is integrally engaged and integrated with the clamping frame 21 sutured as described above, will be explained. As shown in FIG. 8A and FIG. 8B, this clamping member 30 includes a tube portion 33 that extends in a substantially tubular shape towards the distal end side, and a guiding case 34, which is connected to the back end of this tube portion 33 and communicates with the inside thereof. In addition, inside the tube portion 33, a clamping portion 31 is accommodated at a location where the back end of the inner optical fiber G and the distal end of the insertion optical fiber F abut.

As described above, the inside portion of the tube portion 33 is hollow, and at the same time, a clamping member side engaging projection 32 that projects outward is provided in the outer peripheral direction of the outer peripheral surface of the distal end side thereof. In addition, in the outer peripheral surface (the upper side of the figure) of the tube portion 33, a through hole 33b that allows penetration of the insertion members 75 provided in the insertion unit 70 is provided at two locations at a position extending on the axis of the insertion direction of the insertion optical fiber F.

The inside of this guiding case 34 that is connected to the back end of the tube portion 33 is disposed on the axis of the insertion direction of the insertion optical fiber F, and communicates with the inside of the tube portion 33. In addition, the opening portion 34a provided on the back end side of this guiding case 34 is formed in a rounded funnel shape whose diameter increases towards the back end side. Because the opening portion 34a has a funnel shape, the insertion optical fiber F can be advantageously guided so as to align with the axis of the insertion direction when inserted inside the clamping member 30. In addition, on the outer wall of this guiding case 34 in the transverse direction, columnar rotation axles 35 are provided that projects transversely outward. These rotation axles 35 are at locations where they can be fit into the rotation holes 42 provided on the cover body 40. The cover body 40 having the rotation holes 42 into which the rotation axles 35 are fit is structured so as to enable rotation in which the axis of these rotation axles 35 serves as the rotation axis. In addition, at the bottom portion of this guiding case 34, an insertion hole 39 along the insertion direction of the insertion optical fiber F is provided. The hoe shaped portions 54 and the guiding plate portion 51 provided on the guiding plate 50 are inserted into this insertion hole 39.

In addition, the clamping portion 31 is accommodated in the tube portion 33 described above. Specifically, as shown in FIG. 9A and FIG. 9B, in the clamping portion 31, half split elements 36 and 37 are clamped by the C-shaped spring 38 formed in a substantially tube shape that has a C-shape in cross-section, and are thereby elastically supported. As illustrated, suitable inner grooves 36a and 37a are provided in these half split elements 36 and 37. Concretely, the large diameter inner groove 36a extending along the axis of the insertion direction of the insertion optical fiber F is provided in the facing surface 36b of one half split element on only one side. In addition, a large diameter inner groove 37a1 and a small diameter inner groove 37a2 that extend along the axis of the insertion direction of the insertion optical fiber F are provided as inner grooves 37a in the facing surface 37b of the other half split element 37. Note that the inner optical fiber G and the insertion optical fiber F are inserted into these inner grooves 36a and 37a. More specifically, the inner optical fiber G and the insertion optical fiber F, which are bare optical fibers, are inserted into the small diameter inner groove 37a2, and the insertion optical fiber F, which is the coated optical fiber F2 portion, is inserted into the large diameter inner grooves 36a and 37a1. The difference in the length of the diameter of the small diameter and the large diameter is suitable adjusted depending on the thickness of the resin that covers the optical fibers.

In the clamping portion 31 formed in this manner, an insertion member 75 of the insertion unit 70 is wedged into the gap 38a in the C-shaped spring 38 and the slit 38b formed in alignment with the half split elements 36 and 37. In this manner, when an insertion member 75 of the insertion unit 70 is wedged into the slit 38b between the half split elements 36 and 37, the slit 38b of the clamped elements 36 and 37 is expanded. Thereby, the bare optical fiber F1 of the insertion optical fiber F can be inserted into the small diameter inner groove 37a2 described above, and in addition, the coated optical fiber F2 of the insertion optical fiber F can be inserted into the large diameter inner grooves 36a and 37a1 described above. Note that the inner optical fiber G has alay been inserted into the small diameter inner groove 37a2 described above.

Note that inside this tube portion 33, although not specifically illustrated, a suitable gap is provided between the clamping portion 31 and the guiding case 34, and a suitable urging spring is interposed in this suitable gap. One end of this urging spring abuts the inner wall surface of the guiding case 34 and the other end of the urging spring abuts the back end of the clamping portion 31. That is, this clamping portion 31 is urged towards the insertion direction of the insertion optical fiber F by the urging spring (not illustrated), and the distal end thereof advantageously abuts the back end of the ferrule 2. In addition, the ferrule 2 and the clamping portion 31 are advantageously urged as a whole towards the distal end side. Thereby, for example, when the optical connector 1 is connected to the other optical connector, the ferrule 2 is suitably moved to the distal end side or the back end side, and thereby it is possible to exhibit a suitable shock absorbing function.

Next, the cover body 40 that rotates pivoted on the rotation axle 35 provided on the guiding case 34 of the clamping member 30 described above will be explained. As shown in FIG. 10, the cover body 40 is formed having a U-shape in cross-section. On this cover body 40, a distal end side opening portion 41a is provided on the distal end side (T direction) so as to hold the anchoring member 60, and at the same time, a back end side opening portion 41b is provided on the back end side (S direction). Furthermore, the bottom side thereof is also formed so as to open. In other words, this cover body 40 is formed having an upper wall portion 40a and side wall portions 40b that are connected to this upper side wall 40a and disposed parallel to each other. Thereby, it is possible to fit the anchoring member 60 into this cover body 40, and it is further possible to dispose the insertion optical fiber F that is anchored in this anchoring member 60 towards the distal end side.

In addition, on the side wall portions 40b of this cover body 40, rotating holes 42 and 342 that pass through in the transverse direction are provided in proximity to the distal end side opening portion 41a. The rotating axles 35 provided on the guiding case 34 of the clamping member 30 described above are fit into these rotating holes 42. Thereby, this cover body 40 can rotate on the axis of this rotation axle 35, which serves as the axis of rotation. Furthermore, long engaging holes 46 that pass through in the transverse direction (corresponding to the engaging window portion in the present invention) are provided in the middle portion of the side wall portions 40b of the cover body 40. These long engaging holes 46 are formed having a rectangular we extending towards the distal end side (the T direction) and the back end side (the S direction) at the locations where the engaging projecting portions 65 (corresponding to the projecting portions in the present invention) that are provided on the anchoring member 60 are fit. Note that the engaging long holes 46 provided on this cover body 40 are formed having a size that allows play when the engaging projecting portions 65 provided on the anchoring member 60 are fit therein.

In addition, a guiding projection portion 43 (corresponding to the abutment convexity in the present invention) is provided on the inner surface side (below, referred to as the inside surface) of the side wall portions 40b of this cover body 40. Note that in FIG. 10, only one side is illustrated. Concretely, this guiding projection portion 43 is provided between the fitting holes 42 and the long engaging holes 46. The guiding projection portion 43 has a substantially regular parallelepiped shape that extends in the direction orthogonal to the direction of the axis I of the cover body 40, and projects towards the inside of the cover body 40. In addition, a guiding surface 44 is formed on the guiding projection portion 43. The distal end side wall portion of the anchoring member 60 abuts and is guided by this guiding projection portion 43. Concretely, an abutment commencement surface 44a and an abutment holding surface 44b are provided. The abutment commencement surface 44a is formed inclined toward the insertion direction (the T direction) of the insertion optical fiber F from the center portion thereof towards the distal end portion of the lower side thereof. The abutment holding surface 44b is formed orthogonal to the insertion direction (the T direction) of the insertion optical fiber F crossing from the center portion thereof to the distal end portion of the upper side thereof. In addition, a retraction restricting convexity 45 that projects inward is provided on the back end of this cover body 40.

Next the guiding plate 50 will be explained, The guiding plate 50 is installed on the bottom of the clamping member 30 described above, and guides the anchoring member 60 from the bottom side when the anchoring member 60 is approaches or separates from the connector body 10. As shown in FIGS. 11A to 11C, the guiding plate 50 is formed by a guiding plate portion 51 that extends in the insertion direction of the insertion optical fiber F and a handle plate portion 52 that is connected to the back end of this guiding plate portion 51 and extends on the same axis. The guiding plate portion 51 is the part that is inserted into the guiding insertion hole 68 provided on the anchoring member 60, and at the back end portion, which borders with the handle plate portion 52, an abutment projection 53 that projects upward is provided. This abutment projection 53 is a part that abuts the back end side wall surface 67. In addition, hoe shaped portions 54, which project from both sides of the distal end in the transverse direction, are provided on the guiding plate portion 51. These hoe shaped portions 54 are formed having a how shape whose distal end expands in the transverse direction. The guiding plate portion 51 and the hoe shaped portions 54 are inserted into the insertion hole 39 provided on the bottom portion of the clamping member 30 described above. Thereby, the guiding plate 50 is supported so as to be able to move longitudinally and guided in the insertion direction of the insertion optical fiber F. In addition, the extraction of the guiding plate portion 51 from the insertion hole 39 is restricted by the hoe shaped portions 54. The handle plate portion 52 connected to the back end of the guiding plate portion 51 is a part that is grasped by a hand. The operator gasps the handle plate portion 52 by one hand, and can move this guiding plat 50 longitudinally so as to approach and separate from the clamping member 30.

Next, the anchoring member 60 that holds the insertion optical fiber F will be explained. As shown in FIG. 12A, this anchoring member 60 includes an anchoring member body 61 and a lid member 62. The anchoring member body 61 has a U-shape in cross-section and opens upward. The lid portion 62 is thin and hinged at the upper edge portion of the anchoring member body 61 in the traverse direction. In addition, the anchoring member body 61 has a bottom wall portion 61a and side wall portions 61b connected to this bottom wall portion 61a and disposed parallel to each other. That is, the anchoring member body 60 is open at the distal end side and the back end side thereof. Thereby, the insertion optical fiber F can be disposed so as to extend towards the distal end side. Note that these side wall portions 61b form the distal end side wall surface 66 and the back end side wall surface 67 of the anchoring member 60.

In addition, concavo-convex holding portions 63 are provided on the side surface (below, referred to as the inside wall) of the recessed grooves 61c that form the inner portion of the side wall portions 61b of the anchoring member body 61. The concavo-convex holding portions 63 have a concavo-convex form extending from the middle portion to the back end orthogonal to the insertion direction of the insertion optical fiber F. Note that in FIG. 12A, only one side is illustrated. These concavo-convex holding portions 63 are parts that hold the insertion optical fiber F by compressing the outer cover of the insertion optical fiber F (the optical fiber cable F4). In addition, the lid portion 62 is provided so as to outer cover these concavo-convex holding portions 63. That is, similar to the concavo-convex holding portions 63, the lid portion 62 is set to a length that extends from the middle portion to the back end, and hinges the upper edge of the anchoring member body 61 in the transverse direction. Note that on the part of the lid portion 62 opposite to the part that is hinged, a engaging projection 62b that engages the engaging recess portion 62a provided on the anchoring member body 61 is provided. In addition, on the inside surface of the side wall portions 61b of the anchoring member body 61, the inside surface extending from the middle portion to the distal end is formed flat.

In addition, on the outer surface side (below, referred to as the outside surface) of the side wall portions 61b of the anchoring member body 61, at the bottom portion side, an engaging projection portions 65 are provided that project transversely outward extending in the insertion direction of the insertion optical fiber F. These engaging projection portions 65 are parts that fit into the long engaging holes 46 provided on the cover body 40 described above so as to allow play, and the upper surfaces thereof are formed to incline so as to descend outward. Thereby, when this engaging projection portion 65 is fit into the long engaging hole 46, the engagement is smoothly carried out. In addition, a guiding insertion hole 68 formed to extend in the insertion direction of the insertion optical fiber F so as to pass through the thick bottom wall portion 61 is provided. The guiding plate portion 51 of the guiding plate 50 is inserted into this insertion hole 68, as described above. In addition, each portion of this anchoring member body 61 is designed with the following length allocations. Specifically, as shown in the schematic plan view in FIG. 12B, the total length D1 of the anchoring member body 61 that extends in the insertion direction (the T direction) of the optical fiber F (for example, 11.9 mm) is designed to be long in comparison to a conventional one. In addition, the concavo-convex holding portions 63 provided in the recessed grooves 61c forming the inner portion of the anchoring member body 61 are provided in this recessed groove 61c from a position separated distance D2 (for example, 1.7 mm) from the back end portion, which corresponds to the back end side wall portion 67, to a position separated distance D4 (for example, 6.9 mm) from the distal end portion which corresponds to the distal end side wall surface 66. Specifically, the concavo-convex holding portions 63 have a length D3 (for example, 3.3 mm), and are provided in this recessed groove 61c.

Because the anchoring member body 61 is designed having a long D1 in comparison to the conventional length, the anchoring member body 61 is easily held in the hand and easy to handle by the user. In addition, in the recessed groove 61c, because the back end of the concavo-convex holding portions 63 is positioned separated distance D2 from the back end portion of the anchoring member body 61, a suitable clearance is naturally formed from the back end of part that holds the insertion optical fiber F to the back end side wall surface 67. Thereby, even when the insertion optical fiber F bends, bending is not hindered due to this clearance, and furthermore, it is possible to bend gently, In this manner, when the bending of the insertion optical fiber F is gentle, there is the advantage that the optical loss that caused by this bending can be made small. Note that when the distance D4 where the coated optical fiber F2 is positioned is designed to be long, the anchoring member body 61 is easy to hold by hand and thus easy to handle to the user. However, taking into consideration problems such as size, a length D4 that ensures the distance D1 is selected.

The anchoring member body 60 in this embodiment is formed by integrally molding the anchoring member body 61 and the lid portion 62; however, an anchoring member body and a lid portion may be separately provided.

Next the insertion unit 70 will be explained. As shown in FIG. 13A and FIG. 13B, the insertion unit 70 includes a pressing ring portion 71 that is formed in a ring shape and insertion members 75 that are provided so as to project inward from the upper wall portion 72 of the pressing ring portion 71. As shown in FIG. 13B, this pressing ring portion 71 is formed so as to be able to bend and extend in a vertical direction. Specifically, when the upper wall portion 72 of this pressing ring portion 71 is pressed towards the bottom wall portion 73, the side wall portions 74 expand in the transverse direction, and the upper wall portion 72 and the lower wall portion 73 approach each other. Thereby, the insertion member 75 provided on this upper wall portion 72 moves so as to project downward in FIG. 13B. Alternately, when the side wall portions 74 are pressed together so as to approach each other, the insertion members 75 move so as to be extracted.

Specifically, the insertion members 75 that penetrate through the through holes 17 provided in the housing body 12 and the through holes provided in the clamping member 30 expand the slit 38b between the half split elements 36 and 37 by resisting the elasticity of the C-shaped spring 38, and in this state, the insertion optical fiber F can be inserted into the slit 38b between the half split elements 36 and 37. Then, when the side wall portions 74 are pressed so as to approach each other, it is possible to exact he insertion members 75 from the slit 38b between the half split elements 36 and 37. Note that reference numeral 76 is the installation support member for installation on the connector body 10. In addition, a suitable stopper 79 is installed on the installation support portion 76 before the connection operation, as showed in the side view in FIG. 6B.

Next, the procedure in which the insertion optical fiber F is inserted and attached to the optical connector 1 described above will be explained with reference to FIGS. 14A to 14E.

Figure 14A:
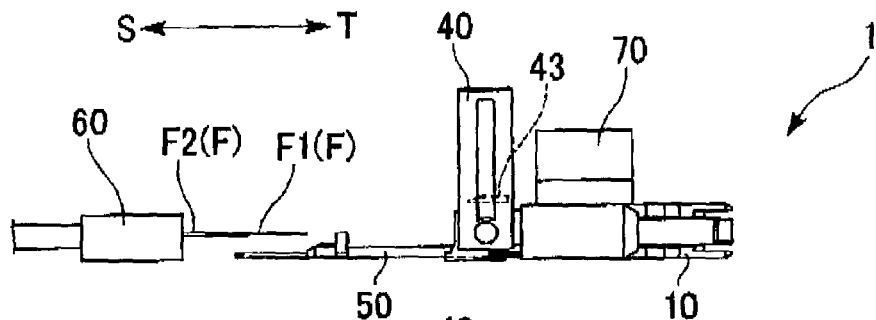
FIGS. 14A to 14E are drawings of the assembled optical connector.

First, as shown in FIG. 14A, a suitable amount of the resin coat of the insertion optical fiber F is removed to expose the bare optical fiber F1. Then, as described above, this insertion optical fiber F is anchored in the anchoring member 60 by holding the insertion optical fiber F in the concavo-convex holding portions 63 and closing the lid portion 62. At this time, the length of the bare optical fiber F1 and the coated optical fiber F2 are preferably set at a length such that the distal end of the insertion optical fiber F (bare optical fiber F1) in the clamping portion 31 bends 0.55 mm when abutted against the back end of the inner optical fiber G. This bending is visually confirmed because the ease of visual conformation is ensured. Note that in this case the cover body 40 of the optical connector 1 is in a stand-by position. That is, the axis H in the insertion direction of he insertion optical fiber F and the center axis I of the cover body 40 are different (deviate from each other).

Figure 14B:
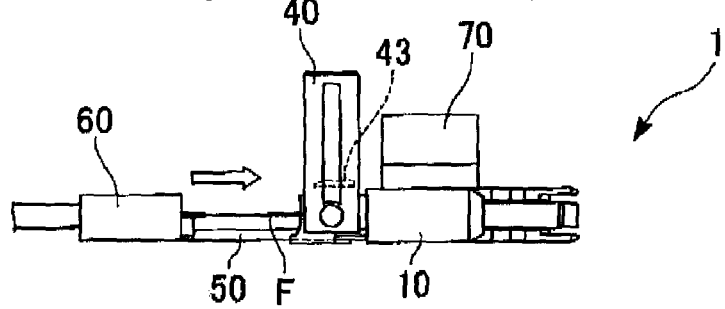
Figure 14C:
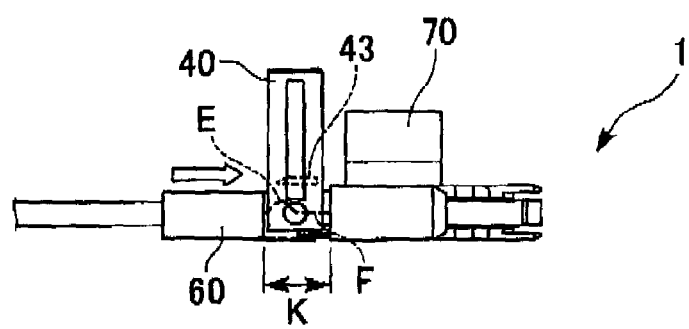

Next, as shown in FIG. 14B, the anchoring member 60 that is holding the insertion optical fiber F is installed on the guiding plate 50. Concretely, the guiding plate portion 51 of the guiding plate 50 is inserted into the guiding insertion hole 68 of the anchoring member 60, and then this guiding plate portion 51 is inserted and installed in the insertion hole 39 of the clamping member 30. Then the anchoring member 60 is made to approach the connector body 10 while being guided by the guiding plate 50. Thereby, as shown in FIG. 14C, the anchoring member 60 approaches the connector body 10, and at the same time, the insertion optical fiber F that is held by the anchoring member 60 also enters the guiding case 34 of the clamping member 30, and finally the insertion optical fiber F (bare optical fiber F1) is held in the small diameter inner groove 37a2 in the elements 36 and 37 of the clamping portion 31. In this case, the slit 38b of the clamped elements 36 and 37 is expanded by the insertion members 75.

Thereby, as shown in FIG. 14C, in the clamping portion 31, the distal end of the insertion optical fiber F (the bare optical fiber F1) abuts the back end of the inner optical fiber G. Then, when the incision optical fiber F is inserted, the bending (reference letter E) of the insertion optical fiber F (bare optical fiber F1) itself begins to occur. By confirming this bending (reference letter E) visually, the operator can confirm that the distal end of the insertion optical fiber F (bare optical fiber F1) that is inserted in the clamping portion 31 has abutted the back end of the inner optical fiber G. Note that the reference letter K in the figure denotes the distance between the anchoring member 60 and the connector body 10 while the fibers are abutted.

Figure 14D:
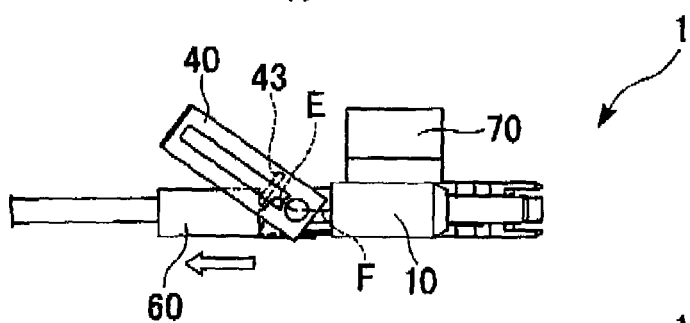

In this manner, when the operator has confirmed that the distal end of the insertion optical fiber F (bare optical fiber F1) in the clamping portion 31 has abutted the back end of the inner optical fiber G, next, as shown in FIG. 14D, the cover body 40, which is in the stand-by position, rotates to the holding position. When this cover body 40 has rotated, the abutment commencement surface 44a of the guiding projection portion 43 provided on this cover body 40 starts to abut the distal end side wall surface 66 of the anchoring member 60. Next, the abutment commencement surface 44a of this guiding projection portion 43 moves the anchoring member 60 by pushing at the back end side while abutting the distal end side wall surface 66 of the anchoring member 60 along with the rotation of the cover body 40. At this time, because the abutment commencement surface 44a is formed to incline in the iron direction (the T direction) of the insertion optical fiber F from the middle portion thereof towards the distal end portion on the lower side thereof, this abutment commencement ice 44a begins to push the anchoring member 60 smoothly.

Figure 14E:
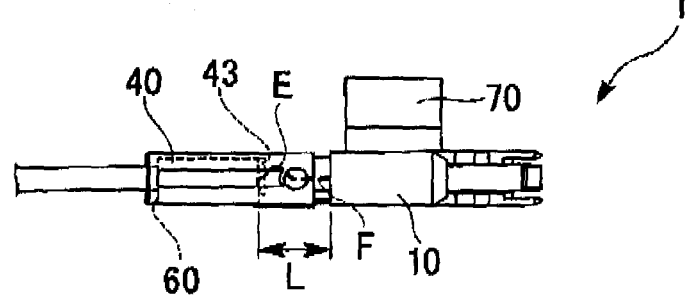

Then, when the cover body 40 has been rotated farther towards the holding position, the abutment commencement surface 44a of the guiding projecting portion 43 abuts the distal end side wall surface 66 of the anchoring member 60 along with the rotation of the cover body 40. Subsequently, the abutment commencement surface 44a contacts the distal end side wall surface 66 of the anchoring member 60 and presses the anchoring member 60. Thereby, the anchoring member 60 is moved by pressing the back end side thereof. Then, as shown in FIG. 14E, the engaging projection portions 65 provided on this anchoring member 60 are fit into the long engaging holes 46 provided on the cover body 40. In this manner, the cover body 40 is positioned at the holding position. That is, axis H in the insertion of the insertion optical fiber F and the axis I of the cover body 40 are at overlapping positions. Note that the engaging projection portion 65 provided on the anchoring member 60 is fit into the long engaging holes 46 so as to allow play.

When the cover body 40 is in the stand-by state, the abutment holding surface 44b of the guiding projection portion 43 abuts the distal end side wall surface 66 of the anchoring member 60. That is, the abutment holding surface 44b of the guiding projection portion 43, which is formed so as to be orthogonal to the insertion direction (the T direction) of the insertion optical fiber F, preferably restricts the movement of the anchoring member 60 towards the distal end side. When the cover body 40 is in the holding state, the insertion unit 70 is operated such that the insertion members 75 are extracted from the clamped elements 36 and 37. Thereby, the inner optical fiber G and the insertion optical fiber F (bare optical fiber F1) are clamped by being fit between the elements 36 and 37 while the distal end thereof are abutted. Note that the reference letter L in the figure denotes the distance between the anchoring member 60 and the connector body 10 in the holding state.

As explained above, because the anchoring member 60 is moved by smoothly pressing the back end side thereof, the reference letter L (the distance between the anchoring member 60 and the connector body 10 in the holding state) is longer than the reference letter K (the distance between the anchoring member 60 and the connector body 10 in the stand-by state). Thereby, the bending E in the holding state can be made small in comparison to the bending in the stand-by state. Concretely, in the example shown in the figures, the reference numeral L is only 0.2 mm longer than the reference numeral K. Specifically, the bending E is reduced from 0.5 mm to 0.3 mm. Note that here, when the amount of bending becomes too small, the abutment force between the back end of the inner optical fiber G and the distal end of the inner optical fiber F (bare optical fiber F1) becomes insufficient, and there may be cases in which loss may occur to the propagated light.

That is, when the optical connector 1 is constructed as described above, when the back end of the inner optical fiber G and the distal end of the insertion optical fiber F (bare optical fiber F1) are abutted, it is possible to confirm 0.5 mm, which is an amount of bending that can be easily confirmed visually, and furthermore, 0.3 mn, in which loss during propagation is small, is an amount of bending that can be confirmed when the back end of the inner optical fiber G and the distal end of the insertion optical fiber F (bare optical fiber F1) have abutted. Thereby, the inconvenience of the loss of propagated light that occurs when the bending is large is eliminated, and thereby an optical connector is obtained in which the inner optical fiber G and the insertion optical fiber F are advantageously connected and the light propagates favorably. Note that when the bending is reduced in this manner, there is particular advantage when a pressure force is applied that occurs when the optical connector 1 is connected to another optical connector.

In addition, because the retraction restricting convexity 45 restricts the retraction of the anchoring member 60, the extraction of this anchoring member 60 from the cover body 40 is advantageously restricted. In addition, because the engaging projection portions 65 of the anchoring member 60 are fit into the long engaging holes 46 of the cover body 40 so as to allow play, they can respond flexibly during elastic deformation.

In addition, because latch portions 15 are provided, detachment is easy when this optical connector 1 is connected to another optical connector. In addition, the inner optical fiber G and the insertion optical fiber F can be fastened in an instant in an abutted state by extracting the insertion members 75.

In addition, because a material having property values for the flexural strength of 60 MPa or greater, an flexural modulus of 1770 MPa or greater, and an elongation at break of 170% or greater was selected as the material for the anchoring member 60, even in a low temperature environment in which the brittleness increases, during the assembly, the hinge portion 62c formed of a thin wall fractured with difficulty. In addition, even when the insertion optical fiber F was pulled, the insertion optical fiber F favorably resisted this pulling force without changing, and was favorably held by this anchoring member 60.

Note that the present invention is not limited to the preferred embodiments, and alterations are possible that do not depart from the gist of the present invention. In the embodiments described above, a case in which the optical connector has a cylindrical shaped ferrule was explained, but this is not limiting. For example, an optical connector having a substantially rectangular shaped ferrule can be used. As long as the structure of the clamping portion is one in which the optical fibers are aligned and the abutment connection between the end surfaces is clamped and held, the structure and shape are not particularly limited. For example, the number of lid bodies opposite to the base body of the elements may be one or plural.

The present invention can be applied to an optical connector in which the optical fiber holes are formed in plurality in a ferrule, and connection optical fibers (first optical fibers) are housed in each of the optical fiber holes. In this case, if the number of alignment structures such as positioning grooves provided on the clamping portion is at least the same as the number of connection optical fibers, each of the optical fibers terminated so as to be optically connectable by the optical connector can be optically connected with the connection optical fibers by the aligning mechanism. An example of this type of optical connector is the MT-type optical connector ferrule (MT: mechanically transferable) having a ferrule stipulated in JIS C 5981 or the like.

What is claimed is:

1. An optical connector comprising:
    a connector body that houses an inner optical fiber that is housed and fastened by a ferrule having a connecting end surface disposed on a distal end side and a portion of which projects from a back end side of the ferrule; and
    an anchoring member that holds an insertion optical fiber whose distal end is abutted and optically connected to a back end of the inner optical fiber, and is formed to allow a distal end of the iron optical fiber to abut the back end of the inner optical fiber when brought into contact with the connector body, wherein
    the connector body is provided with a cover body that is pivotable between a stand-by position, in which an axis of the cover body is out of alignment with an axis of insertion direction of the insertion optical fiber and the anchoring member is approachable to the connector body, and a holding position, in which the axis of the cover body is aligned with the axis of insertion direction of the insertion optical fiber and the anchoring member is covered and held by the cover body,
    an abutment convexity that abuts a distal end side wall surface of the anchoring member is provided so as to project on an inside surface of the cover body opposite to the outer surface of the anchoring member side, and
    the abutment convexity abuts the distal end side wall surface of the anchoring member such that the anchoring member moves while being pushed towards the retracting direction when the cover body is rotated from the stand-by position to the holding position.

2. The optical connector according to claim 1, wherein the abutment surface of the abutment convexity that abuts the distal end side wall surface of the anchoring member is formed so as to slant in the insertion direction of the insertion optical fiber from the center portion to the distal end portion.

3. The optical connector according to claim 1, wherein a retraction restricting convexity, which restricts the movement of the anchoring member in the retraction direction by abutting a back end side wall surface of the anchoring member when the cover body is positioned at the holding position, is provided so as to project on a back end portion of the cover body.

4. The optical connector according to claim 1, wherein
    a projecting portion that projects in the transverse direction is provided on the anchoring member, and
    an engaging window that is engageable with the projecting portion of the anchoring member with play when the cover body is positioned in the holding position is formed in the cover body in the transverse direction.

5. The optical connector according to claim 1, wherein a latch portion that projects towards the distal end side is provided on the connector body.

6. The optical connector according to claim 1, wherein a clamping portion that accommodates clamped half split elements is built into the connector body, and at the same time, insertion members that are wedged into the split between these clamped elements are provided.

* * * * *

UNITED STATES PATENT AND TRADEMARK OFFICE
CERTIFICATE OF CORRECTION

| | | |
|---|---|---|
| PATENT NO. | : 7,347,627 B2 | |
| APPLICATION NO. | : 11/683175 | |
| DATED | : March 25, 2008 | |
| INVENTOR(S) | : Saito et al. | |

It is certified that error appears in the above-identified patent and that said Letters Patent is hereby corrected as shown below:

On title page Item (75)
The name of the sixth inventor should read --Yasuo Oda--.

Signed and Sealed this

Thirtieth Day of September, 2008

JON W. DUDAS
*Director of the United States Patent and Trademark Office*